United States Patent
Sato et al.

(10) Patent No.: US 6,600,034 B2
(45) Date of Patent: Jul. 29, 2003

(54) METHOD OF PRODUCING CELLULOSE POLYMERS

(75) Inventors: Tadahisa Sato, Kanagawa (JP); Katsuyoshi Yamakawa, Kanagawa (JP); Hiroshi Onishi, Kanagawa (JP); Tadahiro Tsujimoto, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 4 days.

(21) Appl. No.: 09/785,322

(22) Filed: Feb. 20, 2001

(65) Prior Publication Data

US 2001/0031861 A1 Oct. 18, 2001

(30) Foreign Application Priority Data

Feb. 18, 2000 (JP) .......................... 2000-042066
Feb. 18, 2000 (JP) .......................... 2000-042081
Aug. 14, 2000 (JP) .......................... 2000-245918
Oct. 13, 2000 (JP) .......................... 2000-313643

(51) Int. Cl.[7] ............. C08B 1/00; C08B 1/02; C08B 3/06; C08B 3/30
(52) U.S. Cl. .......................... 536/56; 536/58; 536/63; 536/76; 536/85; 536/124
(58) Field of Search .............. 536/56, 58, 18.5, 536/55.1, 55.3, 63, 76, 85, 124; 514/23, 54, 57, 25

(56) References Cited

U.S. PATENT DOCUMENTS 5,512,231 A    4/1996  Thies et al.

FOREIGN PATENT DOCUMENTS

EP    0 725 110 A1    8/1996

OTHER PUBLICATIONS

Aniedobe et al., Macromolecules 1997, 30, 2792–2794.*
Aniedobe et al, "Formation of Cellulose Acetate Fibers by the Rapid Expansion of Supercritical Methanol Solutions"; *American Chemical Society*, Macromolecules 1997, vol. 30, No. 9, May 5, 1997, pp. 2792–2794.
European Search Report issued in European Application No. 01 10 3875.

* cited by examiner

*Primary Examiner*—Samuel Barts
*Assistant Examiner*—Michael C. Henry
(74) *Attorney, Agent, or Firm*—Burns, Doane, Swecker & Mathis, LLP

(57) ABSTRACT

A method of making cellulose polymer solution comprises dissolving a cellulose polymer raw material in a chlorine-free organic solvent system under a high temperature and a high pressure condition belonging to the nearcritical or the supercritical region of the system. By removing the solvent from the thus obtained cellulose polymer solution, cellulose polymer powders are also produced.

14 Claims, No Drawings

METHOD OF PRODUCING CELLULOSE POLYMERS

FIELD OF THE INVENTION

The present invention relates to methods of making cellulose polymers, and specifically to method of making cellulose polymer powders and solutions in which cellulose polymers are dissolved at a high concentration.

BACKGROUND OF THE INVENTION

Cellulose polymers, particularly cellulose esters, have advantageous features of a high dimensional stability, an excellent heat resistance and a good adhesive nature compared to ordinary synthetic polymer materials. Owing to these features, cellulose esters are widely used as a component for plastic or lacquer, and also formed to various molding articles such as film or fiber. Cellulose ester films represent the base (support) material for photographic light-sensitive materials, and, due to their optical isotropic nature, are further used as parts of liquid crystal display devices. Such parts include the protecting film for polarizers, the substrate for optical compensation sheets and color filters. Moreover, cellulose polymers are recently attracting social attention from the environmental viewpoint, since the need for biodegradable polymers are increasing.

Though the significance of cellulose polymers represented by cellulose esters must increase in a near future, the manufacture of cellulose ester films has been based on the use of chlorine-containing organic solvents such as methylene chloride to dissolve these esters. The reason why such solvents have been used is the high solubility and the ease of their removal due to their low boiling points. As chlorine-containing solvents are harmful exhibiting carcinogenesis and destroying the ozone layer, their use is more and more rigorously being restricted. In the case of methylene chloride, the discharge into the air is seriously restricted so as not to destroy the ozone layer.

Recently, there are various research activities to solve these problems, part of which is already disclosed. For example, the use of cyclic diether such as 1,3-dioxane and 1,3-dioxolane (JP-A-8-143708 and JP-A-8-323785, the term "JP-A" as used herein means an "unexamined published Japanese patent application") the use of fluoroalcohol such as trifluoroethanol (JP-A-8-143709 and JP-A-11-60807) are proposed. However, cyclic diethers have a problem of insufficient safety including a high inflammability. On the other hand, fluoroalcohols are very expensive and thus are not practically suited for massive use as the solvent for polymer forming.

Though many investigations for inexpensive and safe solvents are being made, there is still another industrial problem; it is very difficult to dissolve cellulose polymers such as cellulose esters in an inexpensive solvent to a concentration required for the manufacturing operation only by simple mixing. Various methods of raising the solubility are also under study. Some examples of such methods include; (1) one based on cooled dissolving described in *Makromol. Chem.*, 143, 105 (1971) (JP-A-9-95538 and JP-A-9-95544), (2) one based on the application of ultra high pressure and the use of organic solvents mainly comprising acetone (JP-A-11-21379), (3) one using ultrasonic wave (JP-A-11-71463), and (4) one using a two-component fluid mixture of acetone, triacetyne, methanol or ethanol with carbon dioxide under a high pressure (JP-A-8-232115, *Journal of Supercritical Fluids,* 13, 135(1988)).

Among these methods, those of (1) to (4) are effective for solubility improvement, but are still accompanied by some problems from the viewpoint of industrial manufacture. In method (1), an extraordinary temperature as low as −70° C. is necessary to achieve a sufficiently high solubility, requiring a very costly equipment. Method (2) also needs an ultra high pressure of about 100 MPa (about 1,000 atmospheric pressure) to achieve a sufficiently high solubility in a short period, and its industrial implementation is quite difficult. Method (3) needs an ultrasonic wave generator of an industrial scale, and at present the development of such a generator is fairly difficult. Method (4) can achieve a concentration level too low to apply to film formation, as the reported concentration in the patent specification and the literature lies between 2 and 4% by weight. In addition, this method based on the use of carbon dioxide has a drawback that the solution once prepared tends to gel partially during a prolonged storage at room temperature.

As is evident from the above description, there is no film forming method by dissolving cellulose polymers without using environmentally harmful chlorine-containing organic solvents and requiring manufacturing equipment of a reasonable cost. Accordingly, new methods are still eagerly expected.

SUMMARY OF THE INVENTION

The invention aims to provide a manufacturing method for readily soluble cellulose polymer powders, which method is safe having a low environmental load and needs a reasonable investment in the manufacturing equipment.

The invention also aims to provide a manufacturing method for cellulose polymer solutions in a very stable solving state, which method is safe and can satisfy the condition for environmental load.

As a result of an extensive investigation carried out to achieve those aims, the inventors of the invention found that by subjecting a dispersion of a cellulose polymer in a chlorine-free organic solvent to a temperature/pressure condition that belongs to the critical, supercritical or nearcritical region of the solvent, the cellulose polymer readily dissolves in the solvent, that the solution does not separate out the polymer even after the solution is kept under ordinary conditions, and further that the polymer, which once has been dissolved by the present method and pulverized after solvent removal, exhibits a higher solubility than the one not having been subjected to such heat treatment. The invention is based on those newly found facts. Accordingly, the above problems have been solved by the following embodiments.

(1) A method of making cellulose polymer powders, comprising dissolving a cellulose polymer raw material in a chlorine-free organic solvent system under a high temperature and a high pressure condition belonging to the near-critical or the supercritical region of said system, and then removing said solvent.

(2) A method of making cellulose polymer solution, comprising dissolving a cellulose polymer raw material in a chlorine-free organic solvent system under a high temperature and a high pressure condition belonging to the near-critical or the supercritical region of said system.

(3) The method described in item (1) or (2) above, wherein the temperature and the pressure under which a cellulose polymer raw material is dissolved in a chlorine-free organic solvent system belong to the nearcritical region of said system.

(4) The method described in item (3) above, wherein the dissolving temperature is not lower than the boiling point and not higher than the critical temperature of said chlorine-free organic solvent system and the dissolving pressure is not lower than 1.013 Mpa (10 kgf/cm$^2$).

(5) The method described in item (3) above, wherein the dissolving temperature is not lower than the boiling point+50K and not higher than the critical temperature of said chlorine-free organic solvent system and the dissolving pressure is not lower than 1.013 Mpa (10 kgf/cm$^2$) and not exceeding the critical pressure of said system.

(6) The method described in item (1) or (2) above, wherein the dissolving temperature is not lower than 423K and not higher than the critical temperature of said chlorine-free organic solvent system and the dissolving pressure is not lower than 1.013 Mpa (10 kgf/cm$^2$) and not exceeding the critical pressure of said system.

(7) The method described in item (1) or (2) above, wherein the dissolving temperature is not lower than 423K and not higher than the critical temperature of said chlorine-free organic solvent system and the dissolving pressure is not lower than 2.026 Mpa (20 kgf/cm$^2$) and not exceeding the critical pressure of said system.

(8) The method described in item (1) or (2) above, wherein the dissolving temperature is not lower than 423K and the dissolving pressure is from 2.026 MPa (20 kgf/cm$^2$) to 7.084 MPa (70 kgf/cm$^2$).

DETAILED DESCRIPTION OF THE INVENTION

In the following, the invention will be described in detail.

Cellulose polymers used in the invention as a raw material include cellulose esters and cellulose ethers. Preferred cellulose esters include aliphatic carboxylic acid esters such as cellulose acetate, cellulose butyrate and cellulose propionate, aromatic carboxylic acid esters such as cellulose half phthalate, inorganic acid esters such as cellulose nitrate, cellulose sulfate and cellulose phosphate, mixed acid esters such as cellulose acetate propionate, cellulose acetate butyrate, cellulose acetate phthalate and cellulose nitrate acetate, and cellulose ester derivatives such as polycaprolactone-grafted cellulose acetate. Cellulose ethers include methyl cellulose, ethyl cellulose, hydroxyethyl cellulose, benzyl cellulose and carboxymethyl cellulose.

Preferred cellulose polymers are cellulose esters, and in particular cellulose acetate (acetyl cellulose).

Degree of substitution in cellulose esters means the degree with which the acyl group has reacted with the hydroxyl group of the cellulose molecule. The degree of substitution 3.00 corresponds to the case where all hydroxyl groups have perfectly reacted; i.e., the three hydroxyl groups present in one glucose unit that is the minimum unit of cellulose molecule are substituted by acyl groups. Cellulose esters used in the invention usually have an average degree of substitution from 1 to 3, and preferably from 2 to 3.

Degree of polymerization (viscosity-average; DP) of a cellulose ester can be obtained from its intrinsic viscosity [η] measured with an Ostwald viscometer by using the relationship of DP=[η]/Km in which Km=6×10$^{-4}$. The degree of polymerization of cellulose esters used in the invention lies between 10 and 1000, preferably between 50 and 900, and more preferably between 200 and 800.

In the case of cellulose acetate, degree of substitution is also expressed in terms of reacted acetic acid % or degree of acetylation. The former represents the weight % of reacted acetic acid (CH$_3$COOH) for the acetylation of the hydroxyl group of cellulose, and the maximum value is 62.5%. On the other hand, the latter represents the weight % of reacted acetyl group (CH$_3$CO), whose maximum value is 44.8%. Reacted acetic acid % is more widely used than degree of acetylation. Cellulose acetate used in the invention has a reacted acetic acid % of from 30 to 62.5%, and preferably not lower than 43%. Still more preferably, this value should be not lower than 55%.

Chlorine-free organic solvents used in the invention include those mainly comprising esters, alcohols, ethers, ketones, hydrocarbons, nitrites, amines and fluorine-substituted hydrocarbons. More preferably, esters containing 2 to 12 carbon atoms, alcohols containing 1 to 6 carbon atoms, ethers containing 4 to 12 carbon atoms, ketones containing 3 to 20 carbon atoms, hydrocarbons containing 5 to 12 carbon atoms, nitrites containing 2 to 12 carbon atoms, amines containing 3 to 12 carbon atoms or fluorine-substituted hydrocarbons containing 5 carbon atoms or more are used. Those solvent materials can contain a ring structure in their molecules.

More specifically, solvent systems mainly comprising the following compounds are preferably used; esters such as methyl, ethyl, propyl or pentyl formate, methyl, ethyl or butyl acetate, dimethyl carbonate and γ-lactone, alcohols such as methanol, ethanol, propanol, isopropanol, ethoxyethanol, ethylene glycol, cyclohexanol and 2,2,2-trifluoroethanol, ethers such as diethyl ether, diisopropyl ether, t-butyl methyl ether, dimethoxymethane, diethoxymethane, dimethoxyethane, 1,4-dioxane, 1,3-dioxolane, tetrahydrofuran, furan, anisole and phenetole, ketones such as acetone, methyl ethyl ketone, diethyl ketone, isopropyl methyl ketone, disobutyl ketone, cyclopentanone, cyclohexanone, 4-methylcyclohexanone, 2,6-di-t-butyl-4-methylcyclohexanone, methoxyacetone and perfluoroacetone, hydrocarbons such as pentane, cyclopentane, cyclohexane and toluene, nitriles such as acetonitrile, propionitrile and isopropionitrile, amines such as propylamine, diethylamine, trimethylamine and triethylamine, fluorine-substituted hydrocarbons such as perfluorohexane, perfluorocyclohexane, fluorobenzene and trifluoromethylbenzene.

Preferred chlorine-free organic solvents used in the invention are those mainly comprising esters containing 2 to 6 carbon atoms, ketones containing 3 to 6 carbon atoms or alcohols containing 1 to 4 carbon atoms. More preferred ones contain esters of 2 to 6 carbon atoms as the major component of the solvent. And, still more preferred ones are those containing esters such as methyl or ethyl acetate as the major component. Still further more preferred ones are mixed solvents comprising ethyl acetate as the major component mixed with acetone, and the most preferred ones are those comprising the above mixed solvents further mixed with alcohols such as methanol or ethanol.

In the invention, the term "major component" means either the sole component (99% by weight or higher purity being assumed) of the solvent system, or the one with the highest content in terms of % by weight in the mixed solvent system containing two or more kinds of solvent. In the case of mixed solvent systems, components other than the major one may be those defined in the invention or those outside the definition of the invention. A representative solvent outside the definition of the invention is water.

In cases where the chlorine-free organic solvent systems are solvent mixtures, the content of the major component is preferably not lower than 30% by weight, and more preferably not lower than 80% by weight. And, in cases where part of solvent mixtures is water, its content is preferably not more than 5% by weight and more preferably not more than 2% by weight.

The organic solvent systems used in the invention are substantially free of environmentally harmful chlorine-containing solvents. The term "substantially free" means that the content of the chlorine-containing solvent in the solvent system is below 5% by weight (preferably below 2% by weight, and most preferably 0% by weight). Typical chlorine-containing solvents are chlorinated aliphatic hydrocarbons such as dichloromethane, chloroform and dichloroethane.

The amount of the solvent used in the invention relative to a unit weight of raw cellulose polymer is from 1 to 200 times of the unit weight (0.5–50% by weight in terms of polymer concentration), and more preferably from 3 to 20 times (5–25% by weight in terms of polymer concentration).

In the production of cellulose polymer powders or cellulose polymer solutions according to the invention, plasticizers, degradation preventing agents, UV absorber and/or light-piping preventing dyes may be added. Suitable plasticizers include phosphate esters such as triphenyl phosphate, tricresyl phosphate and biphenyldiphenyl phosphate, and carboxylic acid esters such as diethyl phthalate, dioctyl phthalate, diethylhexyl phthalate, acetyl triethyl citrate, tributyl citrate, butyl oleate and dibutyl sebacate.

Suitable degradation preventing agents include the compounds disclosed in JP-A-5-197073. Practical examples of UV absorber are disclosed in JP-A-7-11056. Light-piping preventing dyes are dyes soluble in organic solvents which can prevent light-piping by dyeing a film base. Examples of suitable light-piping preventing dyes include spirit black, a product of Chuo Chemical Co., Ltd. and nigrosine base EX, a product of Orient Chemical Industries, Ltd.

In the invention, cellulose polymers as the raw material are dissolved in chlorine-free organic solvent systems mainly comprising the afore-mentioned compounds as the major component under a supercritical or nearcritical condition. Descriptions on critical point, supercritical and nearcritical conditions, etc. follow (See *Chourinkai-Ryutai-no-Kagaku-to-Gijutsu* (Science and Technology of Supercritical Fluids) supervised by S. Saito, published by Sankyo Business in 1996.)

Any substance takes a gaseous, liquid or solid phase according to the surrounding conditions such as temperature or pressure (or volume). Phase transitions are governed by the balance between molecular force and kinetic energy. A phase diagram in which temperature and pressure are plotted along the abscissa and the ordinate, respectively represents the phase/condition relationship and how the phase transitions take place. A point where the gaseous, liquid and solid phases specifically coexist in equilibrium is called triple point. When the temperature is higher than that of the triple point, the liquid and its vapor exist in equilibrium. Then, the system has the saturated vapor pressure, and the curve representing the boundary between the gaseous and liquid phases is called vaporization (or vapor pressure) curve. Under pressures below this curve, the liquid phase disappears via evaporation while, under pressures above this curve, the vapor phase disappears via liquefaction. When the temperature is changed with the pressure kept constant, the liquid evaporates in one side of this curve while on the other side the vapor liquefies. The vaporization curve terminates toward high temperature and pressure conditions, and the terminal point is called critical point. At the critical point that is a significant nature of the substance characterizing it, the difference in liquid and vapor disappears, thus the boundary surface between liquid and vapor also disappears.

When the temperature of the system is higher than the critical temperature, phase transition between the gaseous and liquid phases is possible without passing an equilibrium in which liquid and gas co-exist. The fluid that has a temperature not lower than the critical one and a pressure not lower than the critical one is called supercritical fluid. The temperature-pressure region in which a supercritical fluid exists is called supercritical region. A supercritical fluid is understood as a high density fluid having an extremely high kinetic energy, and behaves like a fluid in that it can dissolve solutes, but at the same time behaves like a gas as its density is variable. Among various features of supercritical fluids, one associated with the invention is an excellent permeability into solid materials owing to their low viscous and highly diffusible property.

The high density region with a temperature slightly lower than the critical one is generally called nearcritical one. In the invention the term "nearcritical region" is defined as the one having a temperature not lower than the boiling point of the organic solvent and a pressure not lower than 10 kgf/cm$^2$ (=1.013 Mpa). A preferred nearcritical region has a temperature equal to 50K above the boiling point or higher and a pressure not lower than 15 kgf/cm$^2$ (=1.520 Mpa). A more preferred nearcritical region corresponds to a temperature not lower than 423K (=150° C.) and a pressure not lower than 20 kgf/cm$^2$ (=2.026 Mpa) Still more preferred region lies at a temperature not lower than 423K (=150° C.) and a pressure of 2.026 to 7.0 Mpa (=20to70 kgf/cm$^2$).

Near the critical point, molecules get associated together forming macro-molecules or clusters. When such clusters grow to a size comparable to the wavelength of light, the supercritical fluid intensely scatters light impinging in the fluid. Therefore, the light transmitting the fluid appears colored. Such coloration is called critical pastel white light. The vapor/liquid critical point of an ordinary fluid is determined by sealing the sample fluid in a closed vessel (vapor/liquid critical point measuring cell) provided with an observation window, through which the vapor/liquid boundary and critical opalescence are observed. The condition at which the boundary disappears and/or the most intense critical opalescence is observed is regarded as the critical point. Alternatively, the disappearance of the meniscus occurring in the boundary between the vapor and the liquid can also be adopted as the indication of critical point. Critical point is defined by critical constants comprising temperature (Tc), critical pressure (Pc) and critical density (ρc). The critical point for solvent mixtures can be similarly determined.

Critical constants for typical solvents used in the invention will be listed below (*Chemistry Encyclopedia*, revised 4th edition edited by Chemical Society of Japan, Fundamental Part II, p. 106–108 (1993)), wherein the following numerals in the parenthesis mean critical temperature in K, critical pressure in Mpa and critical density in kgm$^{-3}$ in this order. Methyl formate (487.2, 6.00, 349), methyl acetate (506.8, 4.69, 325), ethyl acetate (523.2, 3.83, 308), methanol (512.58, 8.09, 272), ethanol (513.9, 6.14, 276), 1-butanol (563.1, 4.42, 270), diisopropyl ether (500.0, 2.88, 265), tetrahydrofuran (540.2, 5.19, 322), dimethoxymethane (481, 3.95, 357), acetone (508.2, 4.70, 278), methyl ethyl ketone (535.6, 4.15, 270), ethane (305.3, 6.14, 276), propane (369.82, 4.250, 217), toluene (591.79, 4.109, 292), acetonitrile (545.5, 4.83, 237), trimethylamine (432.8, 4.087, 233), perfluorohexane (448.6, 1.87, 558), perfluorocyclohexane (457.1, 2.43, 654), and fluorobenzene (560.1, 4.551, 357).

Now, the method with which the raw cellulose polymer is dissolved in a solvent in the critical state, in the supercritical or nearcritical region will be described. The dissolving operation is carried out with a reaction vessel that stands high pressures and can be heated to high temperatures. The most prevailing apparatus is called autoclave. Various types of autoclaves are commercially available to cope with pressure levels and solvent kinds. The invention can be carried out with ordinary type autoclaves that stand an inner pressure up to 30 Mpa (=about 300 atm).

Typical practical procedures will be described for a better understanding of the invention. The inner pressure of an autoclave is determined by the volume of the vessel, the charged solvent quantity and the temperature. In ordinary type autoclaves in which the inner volume is not variable, the solvent quantity must be controlled in order to achieve an aimed temperature and pressure. The needed quantity of solvent is calculated from the critical constants of the solvent. In the case where the critical constants are not established, they are measured by using the above described vapor/liquid critical point measuring cell. With a special autoclave that can continuously vary the inner volume, the pressure can be controlled by varying the volume at a constant temperature, and thus the quantity of solvent is not so critical. To fix the optimum dissolving condition, volume-variable autoclaves are very convenient.

When an ordinary autoclave is used, a calculated quantity of the cellulose polymer in concern is placed in the chamber of the autoclave, and the lid is closed. Then, the chamber is evacuated with a vacuum pump, and the valve to the pump is closed. Another valve is opened to introduce the calculated quantity of solvent. After the introduction, the valve is closed, and the autoclave is heated with an external heat source. By monitoring the change of the inner pressure with a pressure gauge and the change of the inner temperature with a sensor, the inner pressure and temperature are adjusted to the target values.

After the target pressure and temperature were realized, the content is agitated for 1 minute to 100 hours, or preferably 30 minutes to 30 hours until the polymer completely dissolves. More preferably, agitation is continued for from 30 minutes to 10 hours. In the case where an autoclave with an observing window is used, one can determine an optimal agitation period by observing inside the chamber. As cellulose polymers prepared according to the invention are generally readily soluble, highly condensed solutions can be prepared by the procedures described above. But, a further increase of polymer concentration is possible by evaporating part of the organic solvent after the preparation of solution.

Cellulose polymer powders can be obtained by removing the solvent from the solution prepared by the above-described procedures. Such solvent removal can be achieved by any method known in the art. Practical examples include spreading the solution on a band dryer to perfectly remove the solvent followed by pulverization with a crasher, or producing fine particles by ejecting the solution from a nozzle under the application of high pressure. Any of these methods may be appropriately adopted depending on the application of the final product.

EXAMPLES

The invention will be described on some practical examples, but the scope of the invention is not restricted by these examples.

Example 1

Three kinds of pulverized cellulose acetate having different reacted acetic acid % values and different degrees of polymerization were individually placed in the chamber of an autoclave with a window and having an inner volume of 200 mL by the quantities shown in Table 1. A two-way tube was inserted to the inlet aperture in the lid. Each of the two ways was equipped with a valve, and one way was connected to a vacuum pump while the other to a bomb charged with 65 g of methyl acetate. First, the valve to the vacuum pump was opened to evacuate the chamber of the autoclave. When the chamber pressure was reduced to about 200 Pa, the valve was closed. Then, the valve to the bomb was opened to allow the solvent to enter the chamber. Each of the three mixtures thus prepared is named Sample 1, 2 or 3, respectively.

Each sample was then heated to 510K (=237° C.) that exceeds the critical temperature of methyl acetate. At that temperature, the chamber pressure was about 4.9 Mpa. Before heating, each sample was in a state of swollen slurry, but after heated to 510K, all the samples became a homogenous clear solution.

After about 30 min stirring at 510K, each sample was left to cool to room temperature. Under room temperature and the atmospheric pressure, all the samples kept the same state of homogeneous clear solution. The results are summarized in Table 1.

TABLE 1

Solubility in methyl acetate before heating and the solution state after heating

| | Pulverized cellulose acetate | | | Before heating (Comparative example) [ ]; solubility in % by weight | After heating at 510 K. (237° C.), 30 min stirring (The invention) |
|---|---|---|---|---|---|
| | Reacted acetic acid % | Degree of polymerization | Quantity (g) | | |
| Sample 1 | 60.9 | 299 | 15 | Swollen slurry [5] | Homogeneous, clear solution |
| Sample 2 | 60.2 | 323 | 18 | Swollen slurry [7] | Homogeneous, clear solution |
| Sample 3 | 59.2 | 395 | 20 | Swollen slurry [9] | Homogeneous, clear solution |

Example 2

Each of heated Samples 1 to 3 was condensed under reduced pressure until an appropriate viscosity was obtained, and spread on a band dryer. After perfect removal of the solvent, the resulting film was crashed by a crasher to give rise to pulverized cellulose acetate. The thus obtained product was designated Sample 4, 5 or 6. These samples were again dissolved in methyl acetate. The solubility of all the samples noticeably increased by the heating treatment as shown in Table 2.

TABLE 2

Solubility in methyl acetate

| | Pulverized polymer | Solubility (% by weight) |
|---|---|---|
| Sample 4 | Prepared with Sample 1 after heating | 14 |
| Sample 5 | Prepared with Sample 2 after heating | 18 |
| Sample 6 | Prepared with Sample 3 after heating | 25 |

Example 3

The procedures in Example 1 were repeated to prepare Samples 7 to 9 except that the quantity of pulverized cellulose acetate was changed to those shown in Table 3 and that the solvent was replaced to 70 g of methyl formate.

Then, each sample was heated to 490K (=217° C.) that is above the critical temperature of methyl formate. At that temperature, the chamber pressure was elevated to about 6.2 Mpa. Before heating, each sample was in a state of swollen slurry, but after heated to 490K, all the samples became a homogenous clear solution.

After about 30 min stirring at 490K, each sample was left to cool to room temperature. Under room temperature and the atmospheric pressure, all the samples retained the same state of homogeneous clear solution. The results are summarized in Table 3.

TABLE 3

Solubility in methyl formate before heating and solution state change by heating

| | Pulverized cellulose acetate | | | Before heating (Comparative example) [ ]; solubility in % by weight | After heating at 490 K. (217° C.), 30 min stirring (This invention) |
|---|---|---|---|---|---|
| | Reacted acetic acid % | Degree of polymeri-zation | Quantity (g) | | |
| Sample 7 | 60.9 | 299 | 10 | Swollen slurry [1] | Homo-geneous, clear solution |
| Sample 8 | 60.2 | 323 | 12 | Swollen slurry [3] | Homo-geneous, clear solution |
| Sample 9 | 59.2 | 395 | 15 | Swollen slurry [4] | Homo-geneous, clear solution |

Example 4

Heated samples 7 to 9 in Example 3 were treated as in Example 2, and cellulose acetate powders were obtained and designated Sample 10, 11 or 12. These samples were again dissolved in methyl formate. Samples before subjected to the heat treatment described in Example 3 did not substantially dissolve in methyl formate, but the heated ones exhibited higher solubilities than the corresponding unheated ones. A similar solubility improvement was confirmed as for methyl acetate. The results are summarized in Table 4.

TABLE 4

Solubility in methyl formate

| Pulverized polymer | Solubility (% by weight) |
|---|---|
| Sample 10 | Prepared with Sample 7 after heating | 10 |
| Sample 11 | Prepared with Sample 8 after heating | 12 |
| Sample 12 | Prepared with Sample 9 after heating | 15 |

Example 5

The procedures in Example 1 were repeated to prepare Samples 13 to 15 except that the quantity of pulverized cellulose acetate was changed to those shown in Table 5 and that the solvent was replaced to 53 g of diisopropyl ether.

Then, each sample was heated to 450K (=177° C.) that belongs to the nearcritical region of diisopropyl ether. At that temperature, the chamber pressure rose to about 2.0 Mpa. Before heating, the cellulose acetate in each sample dissolved only partially, but after about 2 hr stirring at 450K every sample became a homogenous clear solution. Then, each sample was left to cool to room temperature. Under room temperature and the atmospheric pressure, every sample retained the same state of homogeneous clear solution. The results are summarized in Table 5.

TABLE 5

Changes in the state of diisopropyl ether solution before and after heating

| | Pulverized cellulose acetate | | | Before heating (Comparative example) | After heating at 450 K. (177° C.), 2 hr stirring (This invention) |
|---|---|---|---|---|---|
| | Reacted acetic acid % | Degree of polymeri-zation | Quantity (g) | | |
| Sample 13 | 60.9 | 299 | 20 | Dissolve partially | Homo-geneous clear solution |
| Sample 14 | 60.2 | 323 | 25 | Dissolve partially | Homo-geneous clear solution |
| Sample 15 | 59.2 | 395 | 30 | Dissolve partially | Homo-geneous clear solution |

Example 6

The procedures in Example 1 were repeated to prepare Samples 16 to 18 except that the solvent was replaced to the mixture of 50 g methyl acetate and 5 g ethanol.

Then, each sample was heated to 473K (=200° C.) that belongs to the nearcritical region of the mixed solvent system. At that temperature, the chamber pressure rose to about 3.8 Mpa. Before heating, each sample assumed a state of swollen slurry, but after about 5 hr stirring at 473K every sample became a homogenous clear solution. Then, each sample was left to cool to room temperature. Under room temperature and the atmospheric pressure, every sample retained the same state of homogeneous clear solution. The results are summarized in Table 6.

TABLE 6

Solubility in methyl acetate/ethanol before heating and solution state change by heating

| | Pulverized cellulose acetate | | | Before heating (Comparative example) [ ]; solubility in % by weight | After heating at 473 K. (200° C.), 5 hr stirring (This invention) |
|---|---|---|---|---|---|
| | Reacted acetic acid % | Degree of polymeri-zation | Quantity (g) | | |
| Sample 16 | 60.9 | 299 | 15 | Swollen slurry [2] | Homo-geneous clear solution |
| Sample 17 | 60.2 | 323 | 18 | Swollen slurry [3] | Homo-geneous clear solution |
| Sample 18 | 59.2 | 395 | 20 | Swollen slurry [5] | Homo-geneous clear solution |

Example 7

Three kinds of pulverized cellulose acetate having different reacted acetic acid % values and different degrees of polymerization were individually placed in the chamber of an autoclave with a window and with an inner volume of 200 mL by the quantities shown in Table 7. A two-way tube was inserted to the inlet aperture in the lid. Each of the two ways was equipped with a valve, and one way was connected to a vacuum pump while the other to a nitrogen bomb. First, the valve to the vacuum pump was opened to evacuate the chamber of the autoclave. When the chamber pressure was reduced to about 200 Pa, the valve was closed, and the valve to the bomb was opened to allow nitrogen gas to fill the chamber. Next, the second tube was connected to a solvent introducing pump, which was operated to charge a predetermined quantity of solvent into the chamber. For this operation, the quantity had been converted to the product of flow rate and time. After the solvent charging, the valve was closed. Acetone was used for Samples 19 to 21. By replacing acetone with methyl ethyl ketone or cyclohexane, Samples 22 and 23 were similarly prepared.

Each sample was heated to above the critical or a near-critical temperature of the solvent. The inner pressure at that temperature is shown in the table. Before heating, each sample assumed a state of swollen slurry, but after heating, all the samples became a homogenous clear solution.

After 30 min stirring at that temperature, each sample was left to cool to room temperature. Under room temperature and the atmospheric pressure, all the samples retained the same state of homogeneous clear solution. Separately, each sample before heating was applied a hydrostatic pressure at 25° C. for 30 min by using a pressure device disclosed in JP-A-11-21379 and JP-A-11-322946 for comparison. It was confirmed that such pressure application failed in changing the slurry to a homogeneous clear solution. The results are summarized in Table 7.

Example 8

Each of heated Samples 19 to 23 of the present invention prepared in Example 7 was condensed under reduced pressure until an appropriate viscosity was obtained, and then spread on a band dryer. After perfect removal of the solvent, the resulting film was crashed by a crasher to give rise to pulverized cellulose acetate. The thus obtained product was designated Samples 24 to 28. These samples were again thrown in acetone. The solubility of all the samples noticeably increased by the heating treatment described in Example 7 as shown in Table 8.

TABLE 8

Solubility in acetone

|  | Pulverized polymer | Solubility (% by weight) |
|---|---|---|
| Sample 24 | Prepared with Sample 19 after heating | 11 |
| Sample 25 | Prepared with Sample 20 after heating | 12 |
| Sample 26 | Prepared with Sample 21 after heating | 14 |
| Sample 27 | Prepared with Sample 22 after heating | 11 |
| Sample 28 | Prepared with Sample 23 after heating | 10 |

Example 9

The procedures in Example 7 were repeated to prepare Samples 29 to 32 except that the solvent was replaced to a mixture comprising 50 g of ketone solvent and 5 g of ethanol and that tricresyl phosphate was added to each sample.

Then, each sample was heated above the critical temperature of each ketone solvent. The chamber pressure exhibited at that temperature is shown in Table 9. Before heating, cellulose acetate of each sample dissolved only partially, but after heating every sample became a homogenous clear solution.

After one hour stirring at that temperature, each sample was left to cool to room temperature. Under room temperature and the atmospheric pressure, all the samples retained the same state of homogeneous clear solution. Separately, each sample before heating was applied a hydrostatic pressure at 25° C. for 30 min by using the pressure device as in

TABLE 7

Solubility in ketone solvents before heating and the solution state after heating

|  | Pulverized cellulose acetate | | | | Before heating (Comparative example) | Heating | 30 min stirring | | 30 min stirring at 25° C. at the pressure in the left column (Comparative example) |
|---|---|---|---|---|---|---|---|---|---|
|  | Reacted acetic acid % | Degree of polymerization | Quantity (g) | Ketone solvent | [ ]; solubility in weight % | temp. in K. (° C.) | after heating (The invention) | Pressure in MPa | |
| Sample 19 | 60.9 | 299 | 15 | Acetone | Swollen slurry [2] | 510 (237) | Homogeneous, clear solution | 4.8 | Swollen slurry |
| Sample 20 | 60.2 | 323 | 18 | Acetone | Swollen slurry [3] | 510 (237) | Homogeneous, clear solution | 4.8 | Swollen slurry |
| Sample 21 | 59.2 | 395 | 20 | Acetone | Swollen slurry [5] | 510 (237) | Homogeneous, clear solution | 4.8 | Swollen slurry |
| Sample 22 | 60.9 | 299 | 15 | Methyl ethyl ketone | Swollen slurry [2] | 545 (272) | Homogeneous, clear solution | 4.3 | Swollen slurry |
| Sample 23 | 60.0 | 299 | 15 | Cyclohexanone | Swollen slurry [1] | 550 (277) | Homogeneous, clear solution | 3.4 | Swollen slurry |

Example 7 for comparison. It was confirmed that such pressure application failed to change the slurry to a homogeneous clear solution. The results are summarized in Table 9.

TABLE 9

Changes in the state of ketone/ethanol mixed solutions.

| | Pulverized cellulose acetate | | | Added amount of tricresyl phosphate (g) | Ketone solvent | Heating temp. K. (° C.) | One hour stirring after heating (The invention) | Pressure (Mpa) | 30 min. stirring at 25° C. at the pressure in the left (Comparative example) |
|---|---|---|---|---|---|---|---|---|---|
| | Reacted acetic acid % | Degree of polymerization | Quantity (g) | | | | | | |
| Sample 29 | 60.9 | 299 | 15 | 2.3 | Acetone | 520 (247) | Homogeneous clear solution | 5.0 | Swollen slurry |
| Sample 30 | 60.2 | 323 | 18 | 2.7 | Acetone | 520 (247) | Homogeneous clear solution | 5.0 | Swollen slurry |
| Sample 31 | 59.2 | 395 | 20 | 3.0 | Acetone | 520 (247) | Homogeneous clear solution | 5.0 | Swollen slurry |
| Sample 32 | 60.9 | 299 | 15 | 2.3 | Methyl ethyl ketone | 555 (282) | Homogeneous clear solution | 4.8 | Swollen slurry |

Note:
Before heating, all the samples were in a swollen slurry state.

Example 10

Three kinds of pulverized cellulose acetate having different reacted acetic acid % values and different degrees of polymerization were individually placed in the chamber of a volume variable autoclave with a window having an inner volume of 50 mL by the quantities shown in Table 10. A two-way tube was inserted to the inlet aperture in the lid. Each of the two ways was equipped with a valve, and one way was connected to a vacuum pump while the other to a bomb containing 30 g of solvent. First, the valve to the vacuum pump was opened to evacuate the chamber of the autoclave. When the chamber pressure was reduced to about 200 Pa, the valve was closed, and the valve to the bomb was opened to allow solvent gas to fill the chamber. After the solvent charging, the valve was closed. With the use of various solvents shown in Table 10, Samples 33 to 37 were prepared.

Then, each sample was heated above the critical temperature or to a nearcritical temperature of the solvent. By changing the inner volume, the inner pressure at that temperature was adjusted to the value shown in Table 10. Before heating, each sample assumed a state of swollen slurry, but after heating, every sample became a homogenous clear solution.

After 30 min stirring at that temperature, each sample was left to cool to room temperature. Under room temperature and the atmospheric pressure, all the samples retained the same state of homogeneous clear solution. Separately, each sample before heating was applied a hydrostatic pressure at 25° C. for 30 min by using a pressure device disclosed in JP-A-1121379 and JP-A-11-322946. It was confirmed that such pressure application failed in changing the slurry to a homogeneous clear solution. The results are summarized in Table 10.

TABLE 10

Solubility in various solvents before heating and changes in the solution state (A volume-variable autoclave was used).

| Pulverized cellulose acetate | | | | Before heating (Comparative example) | Heating | 30 min stirring | | 30 min stirring at 25° C. at the pressure in |
|---|---|---|---|---|---|---|---|---|
| | Reacted acetic acid % | Degree of polymeri- zation | Quantity (g) | Solvent (30 g) | [ ]; solubility (% by weight) | temp. K. (° C.) | after heating (The invention) | Pressure (Mpa) | the left (Comparative example) |
| Sample 33 | 60.9 | 299 | 8.0 | Acetone | Swollen slurry [2] | 443 (170) | Homogeneous clear solution | 1.5 | Swollen slurry |
| Sample 34 | 60.2 | 323 | 9.6 | Methyl acetate (27 g), Ethanol (3 g) | Swollen slurry [3] | 443 (160) | Homogeneous clear solution | 1.4 | Swollen slurry |
| Sample 35 | 59.2 | 395 | 12 | Methyl acetate | Swollen slurry [9] | 413 (140) | Homogeneous clear solution | 1.5 | Swollen slurry |
| Sample 36 | 60.9 | 299 | 8.0 | Methyl acetate | Swollen slurry [5] | 453 (180) | Homogeneous clear solution | 2.0 | Swollen slurry |
| Sample 37 | 60.9 | 299 | 8.0 | Methyl acetate | Swollen slurry [5] | 453 (180) | Homogeneous clear solution | 2.5 | Swollen slurry |

Example 11

Each of heated Samples 33 to 37 of the present invention obtained in Example 10 was condensed under reduced pressure until an appropriate viscosity was obtained, and then spread on a band dryer. After perfect removal of the solvent, the resulting film was crashed by a crasher to give rise to pulverized cellulose acetate. The thus obtained product was designated Samples 38 to 42, respectively. Each of these samples was again thrown in the same solvent system as used for heating. The solubility of all the samples noticeably increased by the heating treatment as shown in Table 11.

TABLE 11

Solubility in acetone

| Pulverized polymer | Solubility (% by weight) | Solvent |
|---|---|---|
| Sample 39 | Prepared with Sample 33 after heating | 11 | acetone |
| Sample 39 | Prepared with Sample 34 after heating | 10 | methyl acetate + ethanol |
| Sample 40 | Prepared with Sample 35 after heating | 22 | methyl acetate |
| Sample 41 | Prepared with Sample 36 after heating | 13 | methyl acetate |
| Sample 42 | Prepared with Sample 37 after heating | 14 | methyl acetate |

Example 12

Three kinds of pulverized cellulose acetate having different reacted acetic acid % values and different degrees of polymerization were individually placed in the chamber of a volume variable autoclave with a window having an inner volume of 50 mL by the quantities shown in Table 12. A two-way tube was inserted to the inlet aperture in the lid. Each of the two ways was equipped with a valve, and one way was connected to a vacuum pump while the other to a bomb containing 40 g of solvent. First, the valve to the vacuum pump was opened to evacuate the chamber of the autoclave. When the chamber pressure was reduced to about 200 Pa, the valve was closed, and the valve to the bomb was opened to allow solvent gas to fill the chamber. After the solvent charging, the valve was closed. With the use of various solvents shown in Table 12, Samples 43 to 45 were prepared.

Then, each sample was heated above the critical temperature or to a nearcritical temperature of the solvent. By changing the inner volume, the inner pressure at that temperature was adjusted to the value shown in Table 12. Before heating, each sample assumed a state of swollen slurry, but after heating, every sample became a homogenous clear solution.

After 30 min stirring at that temperature, each sample was left to cool to room temperature. When kept under room temperature and the atmospheric pressure for one week, all the samples retained the same state of homogeneous clear solution.

Separately, as comparative examples, Samples 46 to 48 were prepared by repeating the same procedures as described above only except that the solvent was changed to a mixture of 40 g of an organic solvent and 10 g of carbon dioxide. By being stirred for about 30 min at the temperature and pressure as shown in Table 12, every sample became a substantially homogeneous clear solution. Then, the autoclave was cooled to room temperature, and the lid was opened to slowly leak carbon dioxide from the system. When the resulting solution was left at room temperature and under the atmospheric pressure for one week, partial formation of gel was observed in every solution. The results are summarized in Table 12.

TABLE 12

Solubilities in various solvents before heating and changes in the solution state after heating (A volume-variable autoclave was used.)

| | Pulverized cellulose acetate | | | Before heating (Comparative example) | | |
|---|---|---|---|---|---|---|
| | Reacted acetic acid % | Degree of polymer. | Quantity (g) | Solvent (30 g) | [ ]; solubility (% by weight) | Heating temp. K. (° C.) |
| Sample 43 | 60.9 | 299 | 10.0 | Acetone | Swollen slurry [2] | 443 (170) |
| Sample 44 | 60.2 | 323 | 12.4 | Methyl acetate (27 g) Ethanol (3 g) | Swollen slurry [3] | 433 (160) |
| Sample 45 | 59.2 | 395 | 15.6 | Methyl acetate | Swollen slurry [9] | 413 (140) |
| Sample 46 | 60.9 | 299 | 10.0 | Acetone (40 g) Carbon dioxide (10 g) | Swollen slurry [2] | 443 (170) |
| Sample 47 | 60.9 | 323 | 12.4 | Acetone (37 g) Methanol (3 g) Carbon dioxide (10 g) | Swollen slurry [3] | 443 (160) |
| Sample 48 | 59.2 | 395 | 15.6 | Methyl acetate (40 g) Carbon dioxide (10 g) | Swollen slurry [9] | 413 (140) |

| | 30 min stirring after heating (The invention) | Pressure (Mpa) | After keeping at r. temp. and atmos. press. for one week* | Notes |
|---|---|---|---|---|
| Sample 43 | Homogeneous clear solution | 1.5 | Homogeneous clear solution | This invention |
| Sample 44 | Homogeneous clear solution | 1.4 | Homogeneous clear solution | This invention |
| Sample 45 | Homogeneous clear solution | 1.5 | Homogeneous clear solution | This invention |
| Sample 46 | Substantially homogeneous clear solution | 13.5 | Partial gelation | Comp. example |
| Sample 47 | Homogeneous clear solution | 12.5 | Partial gelation | Comp. example |
| Sample 48 | Homogeneous clear solution | 10.1 | Partial gelation | Comp. example |

*In the comparative examples, after the discharge of carbon dioxide.

According to the invention, powdered cellulose polymers can be manufactured having an excellent solubility to chlorine-free organic solvents, and solutions of cellulose polymers that are stable at high concentrations can be prepared. Accordingly, environment-friendly, economical production of cellulose polymer mold products such as films can be made without using chlorine-containing solvents such as methylene chloride that are harmful as well as have large environmental loads. As a result, possibilities of using cellulose polymers as biodegradable materials have increased.

What is claimed is:

1. A method of making a cellulose polymer powder, comprising dissolving a cellulose polymer raw material in a chlorine-free organic solvent comprising an ester, alcohol, ether, ketone, hydrocarbon, nitrile, amine or fluorine-substituted hydrocarbon as a major component at a temperature of not lower than 423 k and at a pressure of from 2.026 MPa (20 kgf/cm$^2$) to 7.084 MPa (70 kgf/cm$^2$).

2. A method of making a cellulose polymer solution, comprising dissolving a cellulose polymer raw material in a chlorine-free organic solvent comprising an ester, alcohol, ether, ketone, hydrocarbon, nitrile, amine or fluorine-substituted hydrocarbon as a major component at a temperature of not lower than 423 K and at a pressure of from 2.026 MPa (20 kgf/cm$^2$) to 7.084 MPa (70 kgf/cm$^2$).

3. The method as in claim 1, wherein the temperature and the pressure under which a cellulose polymer raw material is dissolved in a chlorine-free organic solvent system belong to the nearcritical region of said system.

4. The method as in claim 2, wherein the temperature and the pressure under which a cellulose polymer raw material is dissolved in a chlorine-free organic solvent system belong to the nearcritical region of said system.

5. A method of making a cellulose polymer powder, comprising dissolving a cellulose polymer raw material in a chlorine-free organic solvent comprising an ester containing 2 to 6 carbon atoms, a ketone containing 3 to 6 carbon atoms or an alcohol containing 1 to 4 carbon atoms as a major component at a temperature of not lower than 423 k and at a pressure of from 2.026 MPa (20 kgf/cm$^2$) to 7.084 MPa (70 kgf/cm$^2$).

6. A method of making a cellulose polymer powder, comprising dissolving a cellulose polymer raw material in a chlorine-free organic solvent comprising an ester containing 2 to 6 carbon atoms, a ketone containing 3 to 6 carbon atoms, an alcohol containing 1 to 4 carbon atoms or an ether containing 4 to 12 carbon atoms as a major component at a temperature of not lower than 423 k and at a pressure of from 2.026 MPa (20 kgf/cm$^2$) to 7.084 MPa (70 kgf/cm$^2$).

7. A method of making a cellulose polymer solution, comprising dissolving a cellulose polymer raw material in a chlorine-free organic solvent comprising an ester containing 2 to 6 carbon atoms, a ketone containing 3 to 6 carbon atoms or an alcohol containing 1 to 4 carbon atoms as a major component at a temperature of not lower than 423 k and at a pressure of from 2.026 MPa (20 kgf/cm$^2$) to 7.084 MPa (70 kgf/cm$^2$.

8. A method of making a cellulose polymer solution, comprising dissolving a cellulose polymer raw material in a chlorine-free organic solvent comprising an ester containing 2 to 6 carbon atoms, a ketone containing 3 to 6 carbon atoms, an alcohol containing 1 to 4 carbon atoms or an ether containing 4 to 12 carbon atoms as a major component at a temperature of not lower than 423 k and at a pressure of from 2.026 MPa (20 kgf/cm$^2$) to 7.084 MPa (70 kgf/cm$^2$).

9. The method of making a cellulose polymer powder according to claim 1, wherein the cellulose polymer raw material is a cellulose acetate having a reacted acetic acid % of not lower than 55%.

10. The method of making a cellulose polymer powder according to claim 5, wherein the cellulose polymer raw material is a cellulose acetate having a reacted acetic acid % of not lower than 55%.

11. The method of making a cellulose polymer powder according to claim 6, wherein the cellulose polymer raw material is a cellulose acetate having a reacted acetic acid % of not lower than 55%.

12. The method of making a cellulose polymer solution according to claim 2, wherein the cellulose polymer raw material is a cellulose acetate having a reacted acetic acid % of not lower than 55%.

13. The method of making a cellulose polymer solution according to claim 7, wherein the cellulose polymer raw material is a cellulose acetate having a reacted acetic acid % of not lower than 55%.

14. The method of making a cellulose polymer solution according to claim 8, wherein the cellulose polymer raw material is a cellulose acetate having a reacted acetic acid % of not lower than 55%.

* * * * *